US012100568B2

(12) United States Patent
Takahashi et al.

(10) Patent No.: US 12,100,568 B2
(45) Date of Patent: Sep. 24, 2024

(54) ELECTROMAGNETIC RELAY

(71) Applicant: OMRON Corporation, Kyoto (JP)

(72) Inventors: Kei Takahashi, Kyoto (JP); Tomohiro Yamakita, Kyoto (JP); Yuichiro Teshima, Kyoto (JP); Koichiro Matsushima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 25 days.

(21) Appl. No.: 17/952,310

(22) Filed: Sep. 26, 2022

(65) Prior Publication Data

US 2023/0121441 A1 Apr. 20, 2023

(30) Foreign Application Priority Data

Oct. 19, 2021 (JP) ................................ 2021-170860

(51) Int. Cl.

*H01H 50/12* (2006.01)
*H01H 50/02* (2006.01)
*H01H 50/14* (2006.01)
*H01H 50/18* (2006.01)
*H01H 50/54* (2006.01)

(52) U.S. Cl.

CPC ............ *H01H 50/12* (2013.01); *H01H 50/02* (2013.01); *H01H 50/14* (2013.01); *H01H 50/18* (2013.01); *H01H 50/54* (2013.01)

(58) Field of Classification Search

CPC ........ H01H 50/12; H01H 50/02; H01H 50/14; H01H 50/18; H01H 50/54
USPC .......................................................... 335/185
See application file for complete search history.

(56) References Cited

U.S. PATENT DOCUMENTS 3,204,057 A * 8/1965 Magida ................ H01H 51/287 335/133
4,429,292 A * 1/1984 Schedele ................ H01H 50/36 335/135
4,599,588 A * 7/1986 Bell ..................... H01H 1/5822 439/942
5,027,094 A * 6/1991 Yasuoka ................ H01H 50/14 335/83
5,352,999 A * 10/1994 Hoffmann .............. H01H 50/14 335/86
5,572,176 A * 11/1996 Heinzl ................. H01H 50/642 335/131

(Continued)

FOREIGN PATENT DOCUMENTS

JP 2021-57225 A 4/2021

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a housing, a first fixed terminal, a movable contact piece, and a drive device. The first fixed terminal includes a first main member and a first layer member. The first main member protrudes from inside the housing to outside the housing. The first layer member is provided separately from the first main member. The first layer member is laminated on the first main member. The first layer member protrudes from inside the housing to outside the housing. The first layer member has a shape branched from the first main member. The movable contact piece is disposed in the housing and faces the first fixed terminal. The drive device moves the movable contact piece in a contact direction and an opening direction.

11 Claims, 12 Drawing Sheets

(56) References Cited

U.S. PATENT DOCUMENTS

| | | | | | |
|---|---|---|---|---|---|
| 5,982,257 | A * | 11/1999 | Vernier | H01H 50/54 335/274 |
| 6,377,143 | B1 * | 4/2002 | Zhou | H01H 50/546 218/154 |
| 2012/0313737 | A1 * | 12/2012 | Iwamoto | H01H 51/06 335/185 |
| 2013/0069744 | A1 * | 3/2013 | Shinkai | H01H 11/00 335/2 |
| 2014/0015628 | A1 * | 1/2014 | Shinkai | H01H 50/305 335/189 |
| 2014/0028418 | A1 * | 1/2014 | Yamashita | H01H 50/54 335/201 |
| 2014/0062626 | A1 * | 3/2014 | Saito | H01H 51/04 335/185 |
| 2014/0184366 | A1 * | 7/2014 | Ito | H01H 50/54 335/189 |
| 2015/0318133 | A1 * | 11/2015 | Lauraire | H01H 50/14 335/185 |
| 2018/0261414 | A1 * | 9/2018 | Fujimura | H01H 50/24 |
| 2020/0105488 | A1 * | 4/2020 | Ikushima | H01H 9/443 |
| 2020/0161067 | A1 * | 5/2020 | Harano | H01H 9/383 |
| 2020/0176206 | A1 * | 6/2020 | Kubono | H01H 50/54 |
| 2020/0176207 | A1 * | 6/2020 | Kubono | H01H 50/043 |
| 2020/0350134 | A1 * | 11/2020 | Ishikawa | H01H 50/36 |
| 2020/0373111 | A1 * | 11/2020 | Zhong | H01H 50/541 |
| 2021/0012977 | A1 * | 1/2021 | Nishide | C22C 1/10 |
| 2021/0043404 | A1 * | 2/2021 | Sasaki | H01H 50/58 |
| 2021/0098216 | A1 * | 4/2021 | Omari | H01H 47/001 |
| 2021/0304992 | A1 * | 9/2021 | Kroeker | H01H 50/02 |

* cited by examiner

ELECTROMAGNETIC RELAY

CROSS-REFERENCE TO RELATED APPLICATION

This application claims priority to Japanese Patent Application No. 2021-170860, filed Oct. 19, 2021. The contents of that application are incorporated by reference herein in their entirety.

FIELD

The present invention relates to an electromagnetic relay.

BACKGROUND

An electromagnetic relay includes a fixed terminal, a movable contact piece, and a housing. For example, in Japanese Patent Application Publication No. 2021-057225, the fixed terminal protrudes from inside the housing to outside the housing. The movable contact piece is configured to move in a contact direction and an opening direction. The contact direction is a direction in which the movable contact piece contacts the fixed terminal. The opening direction is a direction in which the movable contact piece separates from the fixed terminal. A current flows through the fixed terminal when the movable contact piece contacts the fixed terminal.

SUMMARY

When a large current flows through the electromagnetic relay, the amount of heat generated at the fixed terminal increases. Therefore, it is desired to improve heat dissipation by increasing the surface area of the fixed terminal. However, if the fixed terminal is enlarged in order to increase the surface area of the fixed terminal, the size of the electromagnetic relay is increased. Further, when the amount of heat generated at the fixed terminal increases, the thermal influence from the fixed terminal to a substrate increases. It is an object of the present invention to improve the heat dissipation property of a fixed terminal and to reduce a thermal effect from the fixed terminal to a substrate while suppressing an increase in a size of an electromagnetic relay.

An electromagnetic relay according to one aspect of the present invention includes a housing, a first fixed terminal, a movable contact piece, and a drive device. The first fixed terminal includes a first main member and a first layer member. The first main member protrudes from inside the housing to outside the housing. The first layer member is provided separately from the first main member. The first layer member is laminated on the first main member. The first layer member protrudes from inside the housing to outside the housing. The first layer member has a shape branched from the first main member. The movable contact piece is disposed in the housing and faces the first fixed terminal. The drive device is configured to move the movable contact piece in a contact direction and an opening direction. The contact direction is a direction in which the movable contact piece contacts the first fixed terminal. The opening direction is a direction in which the movable contact piece separates from the first fixed terminal.

In the electromagnetic relay according to the present aspect, the first fixed terminal includes the first main member and the first layer member which are separate bodies from each other, and the first layer member is branched from the first main member. Therefore, the surface area of the first fixed terminal is increased while suppressing the enlargement of the first fixed terminal. As a result, the heat dissipation of the first fixed terminal is improved while suppressing an increase in the size of the electromagnetic relay. Also, the current flowing through the first fixed terminal is split between the first main member and the first layer member. Therefore, when the electromagnetic relay is mounted to the substrate, the heat from the first fixed terminal is distributed to the first main member and the first layer member and transferred to the substrate. Thereby, the thermal influence from the first fixed terminal to the substrate is reduced.

The first layer member may include a connecting portion and a terminal portion. The connecting portion may be disposed on the first main member in the housing. At least a portion of the terminal portion may be disposed outside the housing. The terminal portion may be spaced apart from the first main member. In this case, the terminal portion is spaced apart from the first main member, thereby the surface area of the first fixed terminal is increased. Therefore, the heat dissipation of the first fixed terminal is improved.

The first layer member may further include a step portion disposed between the connecting portion and the terminal portion. The first layer member may be bent between the connecting portion and the step portion and between the step portion and the terminal portion. In this case, the step portion spaces the terminal portion from the first main member. Thereby, the heat dissipation of the first fixed terminal is improved.

The housing may include a base supporting the first fixed terminal. The first fixed terminal may protrude out of the housing from a bottom surface of the base. A lower end of the first main member may be located below the bottom surface of the base. A lower end of the first layer member may be located below the bottom surface of the base. In this case, the first main member and the first layer member are easily connected to a substrate.

The base may include a leg projecting downwardly from the bottom surface. The lower end of the first main member may be located below a lower end of the leg. The lower end of the first layer member may be located below the lower end of the leg. In this case, the first main member and the first layer member are easily connected to the substrate. Further, a space is provided between the bottom surface of the base and the substrate by the leg contacting the substrate. Therefore, part of the first main member and part of the first layer member are disposed in the space between the bottom surface of the base and the substrate. Thereby, the heat dissipation of the first fixed terminal is improved.

The first main member and the first layer member may have a plate-like shape. The plate thickness of the first layer member may be different from the plate thickness of the first main member. In this case, the temperature rise values of the first layer member and the first main member can be arbitrarily changed according to the ratio of the plate thickness of the first layer member and the plate thickness of the first main member.

The electromagnetic relay may further include a second fixed terminal. The second fixed terminal may include a second main member and a second layer member. The second main member may protrude from inside the housing to outside the housing. The second layer member may be provided separately from the second main member. The second layer member may be laminated on the second main member. The second layer member may protrude from inside the housing to outside the housing. The second layer member may have a shape branched from the second main member. In this case, the surface area of the second fixed terminal increases while suppressing the enlargement of the second fixed terminal. As a result, the heat dissipation of the second fixed terminal is improved while suppressing an increase in the size of the electromagnetic relay. Moreover, the thermal influence from the second fixed terminal to the substrate is reduced.

The first layer member and the second layer member may be disposed on the same side with respect to the first main member and the second main member. In this case, the first layer member and the second layer member are disposed compactly.

The first layer member and the second layer member may be disposed on opposite sides to each other with respect to the first main member and the second main member. In this case, the heat dissipation properties of the first layer member and the second layer member are improved respectively.

The first fixed terminal may further include a third layer member. The third layer member may be provided separately from the first main member and the first layer member. The third layer member may protrude from inside the housing to outside the housing. The third layer member may have a shape branched from the first main member. In this case, the heat dissipation of the first fixed terminal is further improved. Moreover, the thermal influence from the first fixed terminal to the substrate is further reduced.

The third layer member may be laminated on the first layer member. In this case, the first layer member and the third layer member are laminated on the same side with respect to the first main member. Thereby, the first layer member and the third layer member are disposed compactly.

The third layer member may be laminated on the first main member on the opposite side of the first layer member. In this case, the first layer member and the third layer member are laminated on opposite sides to each other with respect to the first main member. Thereby, the heat dissipation properties of the first layer member and the third layer member are improved respectively.

DETAILED DESCRIPTION

Figure 1:
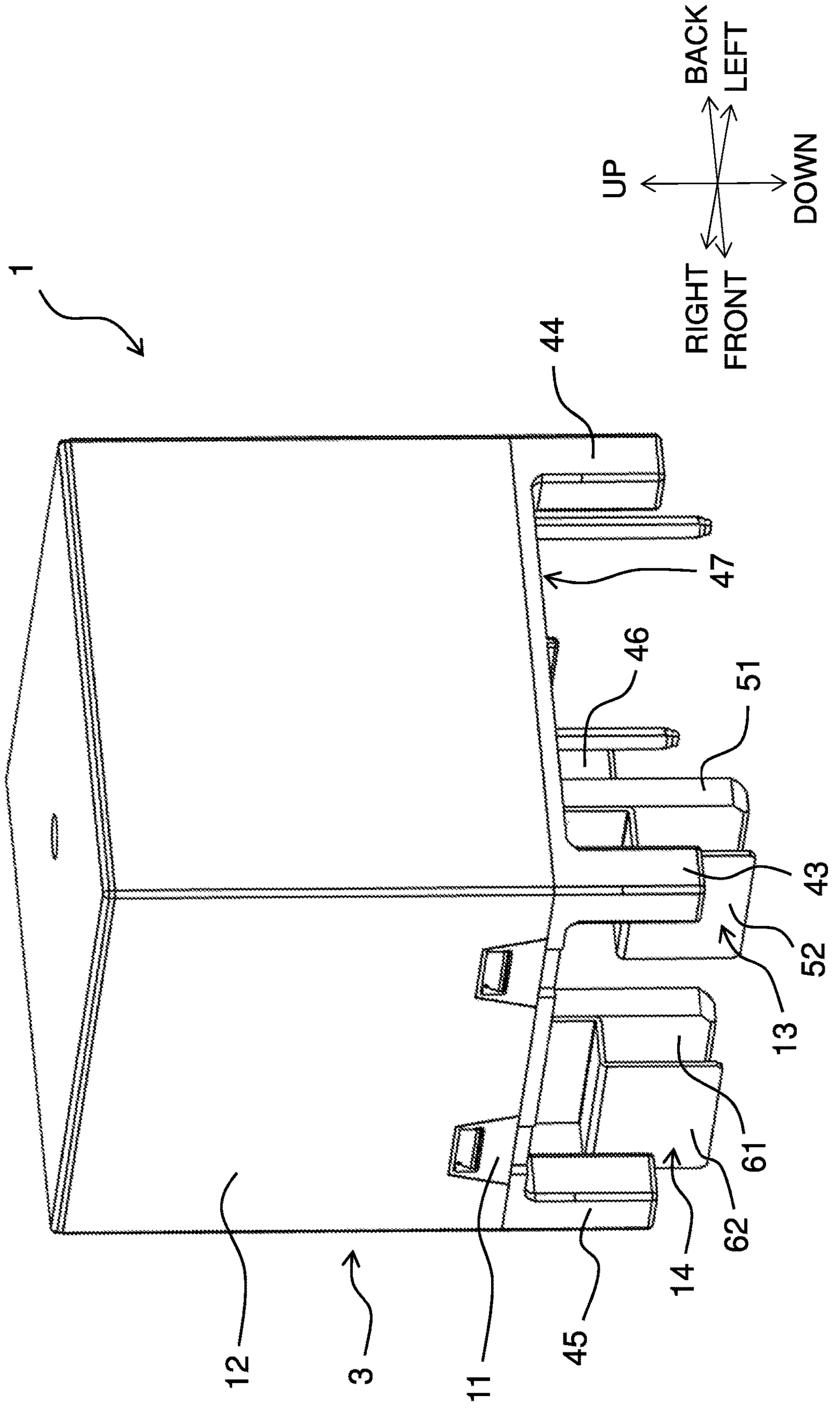
FIG. 1 is an external perspective view of an electromagnetic relay according to a first embodiment.
Figure 2:
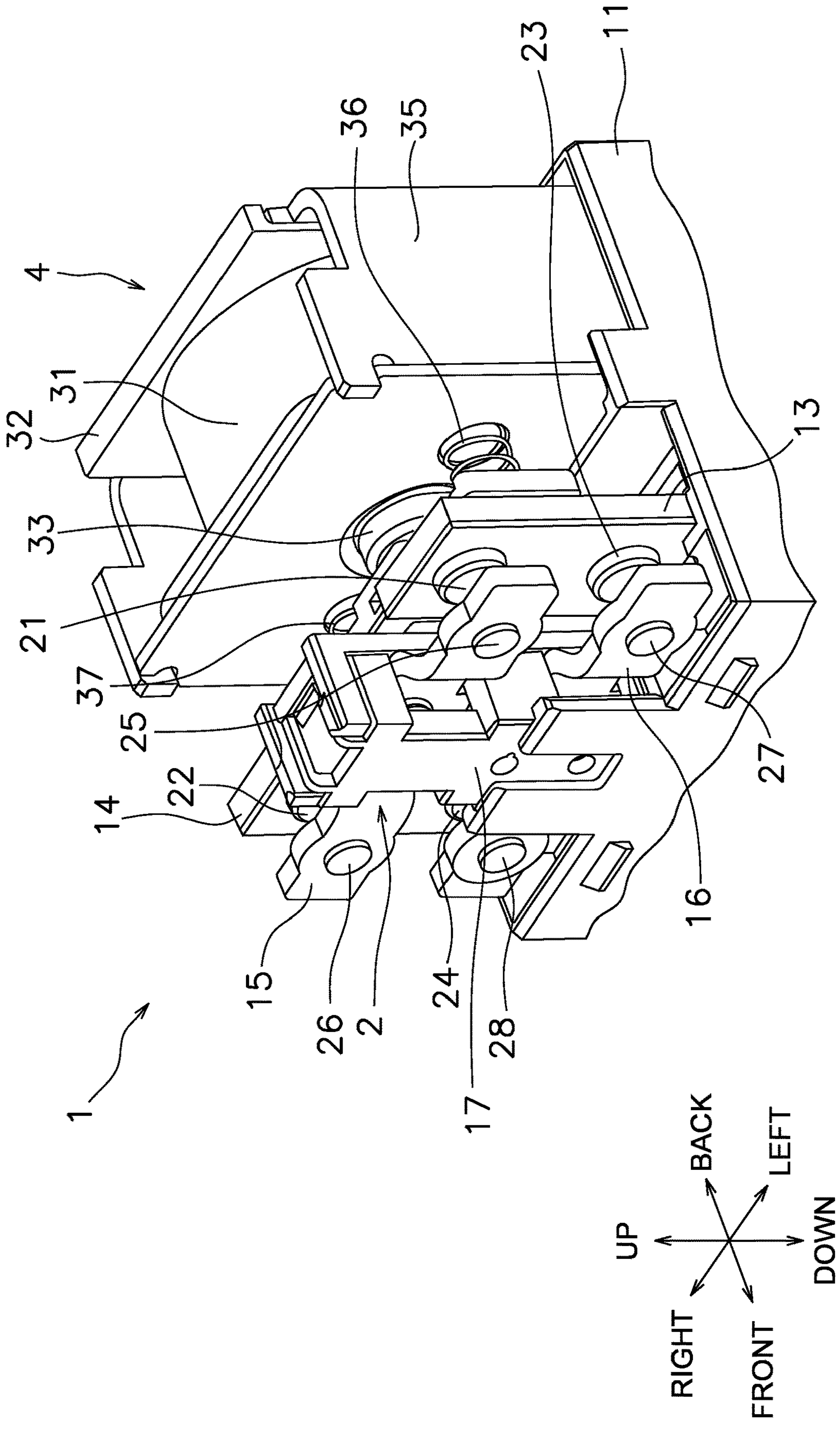
FIG. 2 is a perspective view of an inside of the electromagnetic relay.
Figure 3:
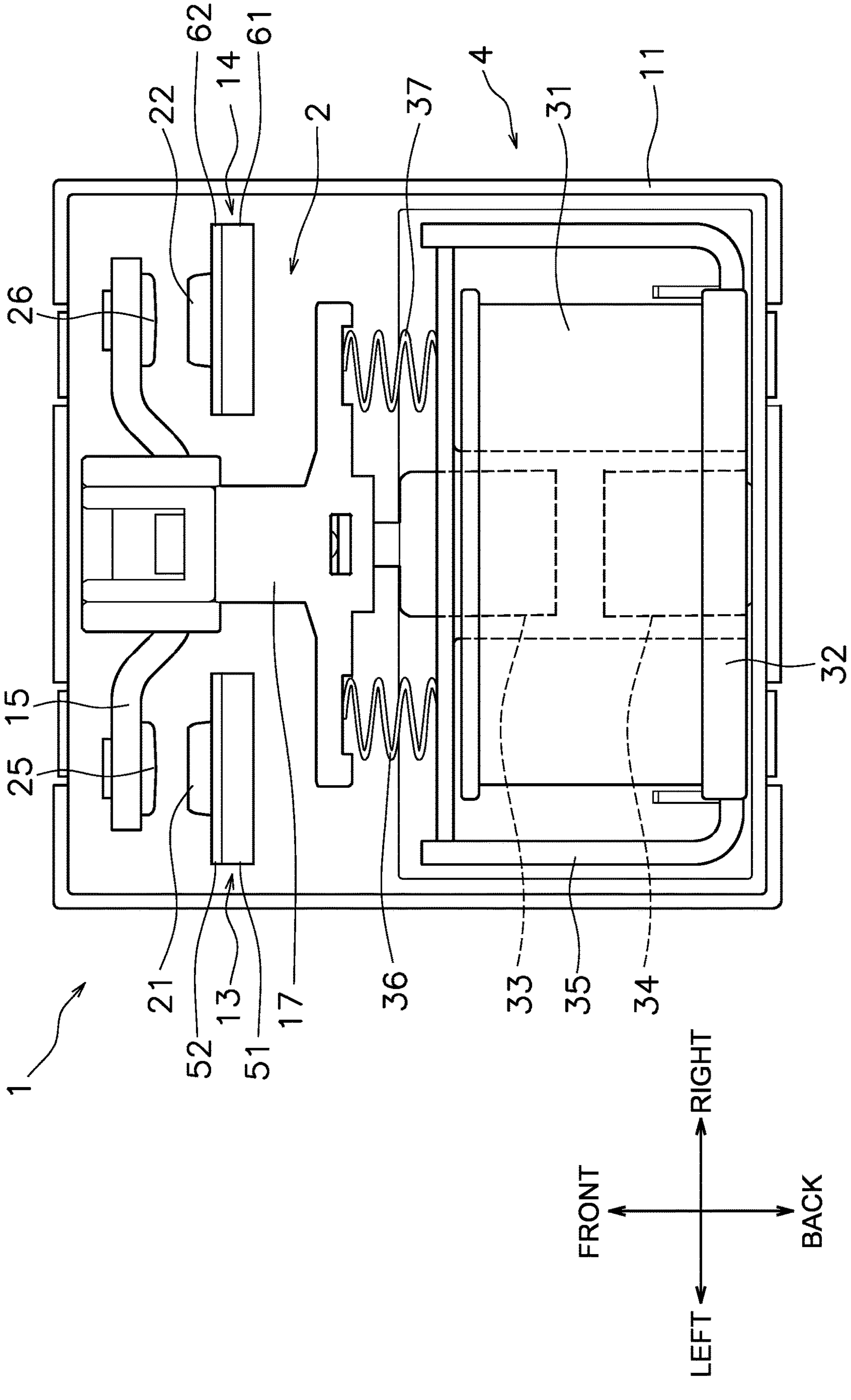
FIG. 3 is a top view of the electromagnetic relay when a moving member is in an open position.
Figure 4:
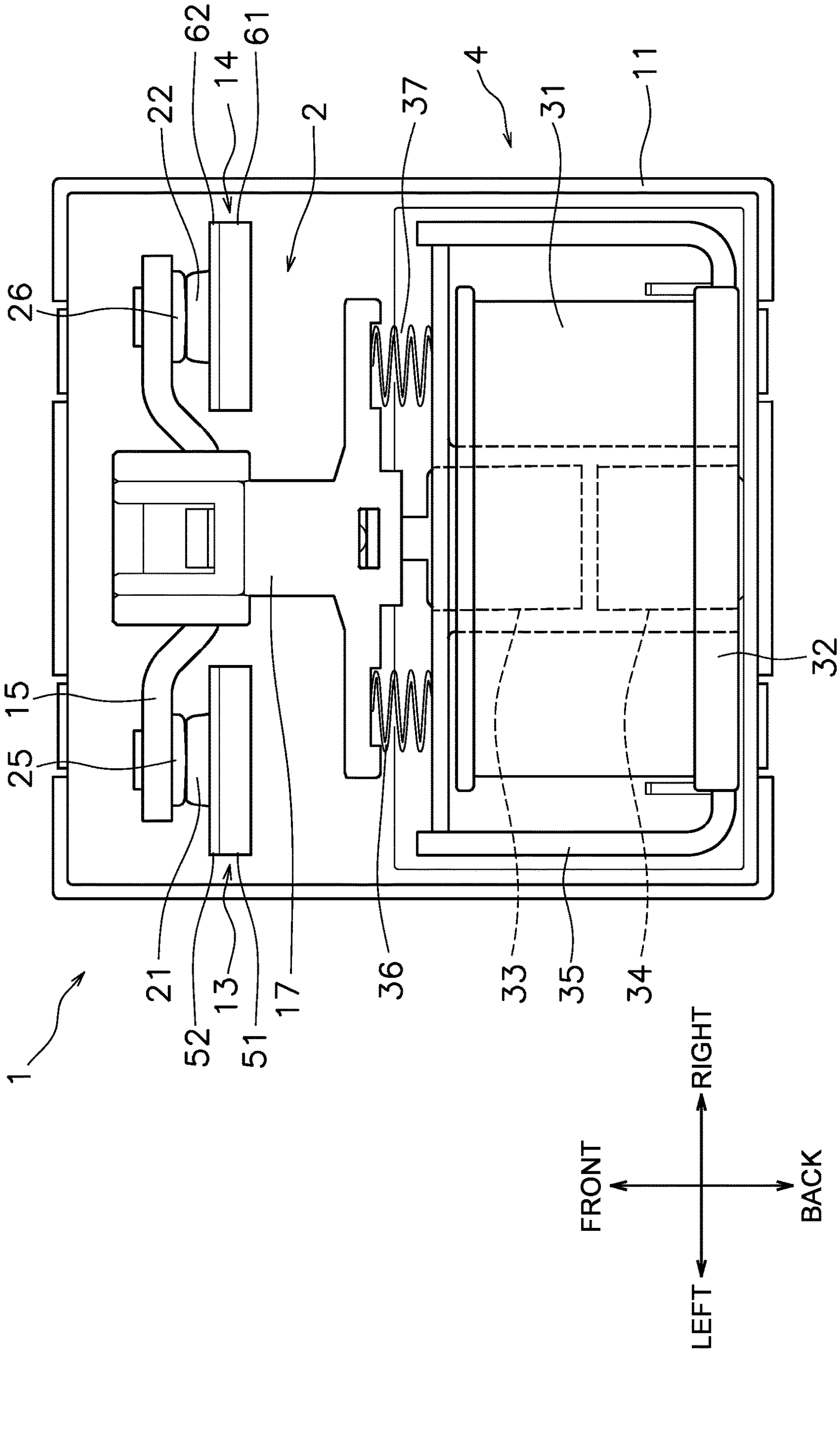
FIG. 4 is a top view of the electromagnetic relay when the moving member is in a closed position.

An electromagnetic relay 1 according to an embodiment will be described below with reference to the drawings. FIG. 1 is an external perspective view of an electromagnetic relay 1 according to a first embodiment. FIG. 2 is a perspective view of the inside of the electromagnetic relay 1. FIGS. 3 and 4 are top views of the inside of the electromagnetic relay 1.

The electromagnetic relay 1 includes a contact device 2, a housing 3, and a drive device 4. The contact device 2 and the drive device 4 are disposed in the housing 3. The housing 3 includes a base 11 and a case 12. The case 12 is omitted in FIGS. 2 to 4. The base 11 supports the contact device 2 and the drive device 4.

In the following description, the direction from the base 11 toward the contact device 2 and the drive device 4 is defined as upward, and the opposite direction is defined as downward. The direction from the drive device 4 towards the contact device 2 is defined as forward and the opposite direction as rearward. The direction perpendicular to the up-down direction and the front-back direction is defined as the left-right direction.

The contact device 2 includes a first fixed terminal 13, a second fixed terminal 14, a first movable contact piece 15, a second movable contact piece 16, and a moving member 17. The first fixed terminal 13 and the second fixed terminal 14 are made of a conductive material such as copper. The first fixed terminal 13 and the second fixed terminal 14 each extend vertically.

The first fixed terminal 13 and the second fixed terminal 14 are disposed apart from each other in the left-right direction. The first fixed terminal 13 and the second fixed terminal 14 are fixed to the base 11. The first fixed terminal 13 and the second fixed terminal 14 protrude from inside the housing 3 to the outside the housing 3. The first fixed terminal 13 and the second fixed terminal 14 protrude downward from the base 11.

A first fixed contact 21 and a third fixed contact 23 are connected to the first fixed terminal 13. A second fixed contact 22 and a fourth fixed contact 24 are connected to the second fixed terminal 14. The first to fourth fixed contacts 21 to 24 are made of a conductive material such as silver or copper.

The first movable contact piece 15 and the second movable contact piece 16 extend in the left-right direction. The first movable contact piece 15 and the second movable contact piece 16 are provided separately from each other. The first movable contact piece 15 and the second movable contact piece 16 are made of a conductive material such as copper.

The first movable contact piece 15 is disposed to face the first fixed terminal 13 and the second fixed terminal 14. A first movable contact 25 and a second movable contact 26 are connected to the first movable contact piece 15. The first movable contact 25 is disposed to face the first fixed contact 21. The second movable contact 26 is disposed to face the second fixed contact 22.

The second movable contact piece 16 is disposed to face the first fixed terminal 13 and the second fixed terminal 14. A third movable contact 27 and a fourth movable contact 28 are connected to the second movable contact piece 16. The third movable contact 27 is disposed to face the third fixed contact 23. The fourth movable contact 28 is disposed to face the fourth fixed contact 24. The first to fourth movable contacts 25 to 28 are made of a conductive material such as silver or copper.

The moving member 17 holds the first movable contact piece 15 and the second movable contact piece 16. The moving member 17 is made of an electrically insulating resin. The moving member 17 is movable in the front-rear direction. The moving member 17 is movable between a closed position and an open position. In FIG. 3, the moving member 17 is in the open position. When the moving member 17 is in the open position, the movable contacts 25 to 28 are separated from the fixed contacts 21 to 24, respectively. In FIG. 4, the moving member 17 is in the closed position. When the moving member 17 is in the closed position, the movable contacts 25 to 28 contact the fixed contacts 21 to 24, respectively.

The drive device 4 moves the first movable contact piece 15 and the second movable contact piece 16 by electromagnetic force. The drive device 4 moves the first movable contact piece 15 and the second movable contact piece 16 in a contact direction and an opening direction. The contact direction is a direction in which the movable contacts 25 to 28 contact the fixed contacts 21 to 24. The opening direction is a direction in which the movable contacts 25 to 28 separate from the fixed contacts 21 to 24. In this embodiment, the contact direction is rearward and the opening direction is forward.

The drive device 4 includes a coil 31, a spool 32, a movable iron core 33, a fixed iron core 34, and a yoke 35. The coil 31 is wound around the spool 32. At least part of the movable iron core 33 is disposed in the spool 32. The movable iron core 33 is configured to move in the front-rear direction. The fixed iron core 34 is disposed in the spool 32. The fixed iron core 34 is disposed to face the movable iron core 33. The coil 31 generates an electromagnetic force that moves the movable iron core 33 when energized.

The movable iron core 33 is connected to the moving member 17. The movable iron core 33 moves in the contact direction according to the magnetic force generated from the coil 31. As the movable iron core 33 moves, the moving member 17 moves to the closed position. The yoke 35 is disposed to surround the coil 31. The yoke 35 is disposed on the magnetic circuit formed by the coil 31.

The electromagnetic relay 1 includes a first return spring 36 and a second return spring 37. The first return spring 36 and the second return spring 37 are disposed between the moving member 17 and the drive device 4. The first return spring 36 and the second return spring 37 bias the moving member 17 in the opening direction.

Next, operation of the electromagnetic relay 1 will be described. When the coil 31 is not energized, the drive device 4 is not excited. In this case, the moving member 17 is pressed in the opening direction together with the movable iron core 33 by the elastic forces of the return springs 36 and 37, and the moving member 17 is located at the open position shown in FIG. 3.

In this state, the first movable contact piece 15 and the second movable contact piece 16 are also pressed in the opening direction via the moving member 17. Therefore, when the moving member 17 is at the open position, the first movable contact 25 and the second movable contact 26 are separated from the first fixed contact 21 and the second fixed contact 22. Similarly, when the moving member 17 is at the open position, the third movable contact 27 and the fourth movable contact 28 are separated from the third fixed contact 23 and the fourth fixed contact 24.

When the coil 31 is energized, the drive device 4 is excited. In this case, the electromagnetic force of the coil 31 causes the movable iron core 33 to move in the contact direction against the elastic forces of the return springs 36 and 37. Thereby, the moving member 17, the first movable contact piece 15, and the second movable contact piece 16 move together in the contact direction. Accordingly, the moving member 17 moves to the closed position, as shown in FIG. 4.

As a result, when the moving member 17 is in the closed position, the first movable contact 25 and the second movable contact 26 contact the first fixed contact 21 and the second fixed contact 22, respectively. Similarly, when the moving member 17 is in the closed position, the third movable contact 27 and the fourth movable contact 28 contact the third fixed contact 23 and the fourth fixed contact 24, respectively. Thereby, the first movable contact piece 15 and the second movable contact piece 16 are electrically connected to the first fixed terminal 13 and the second fixed terminal 14.

When the current to the coil 31 is stopped and demagnetized, the movable iron core 33 is pushed in the opening direction by the elastic forces of the return springs 36 and 37. As a result, the moving member 17, the first movable contact piece 15, and the second movable contact piece 16 move together in the opening direction. Accordingly, the moving member 17 moves to the open position, as shown in FIG. 3.

As a result, when the moving member 17 is at the open position, the first movable contact 25 and the second movable contact 26 are separated from the first fixed contact 21 and the second fixed contact 22. Similarly, when the moving member 17 is at the open position, the third movable contact 27 and the fourth movable contact 28 are separated from the third fixed contact 23 and the fourth fixed contact 24.

When a large current flows in the electromagnetic relay 1, the first and second fixed terminals 13 and 14 and the first and second movable contact pieces 15 and 16 become hot. As shown in FIG. 1, in the electromagnetic relay 1 according to the present embodiment, the first fixed terminal 13 and the second fixed terminal 14 have branched shapes in order to improve the heat dissipation performance of the electromagnetic relay 1. The structures of the first fixed terminal 13 and the second fixed terminal 14 will be described in detail below.

Figure 5:
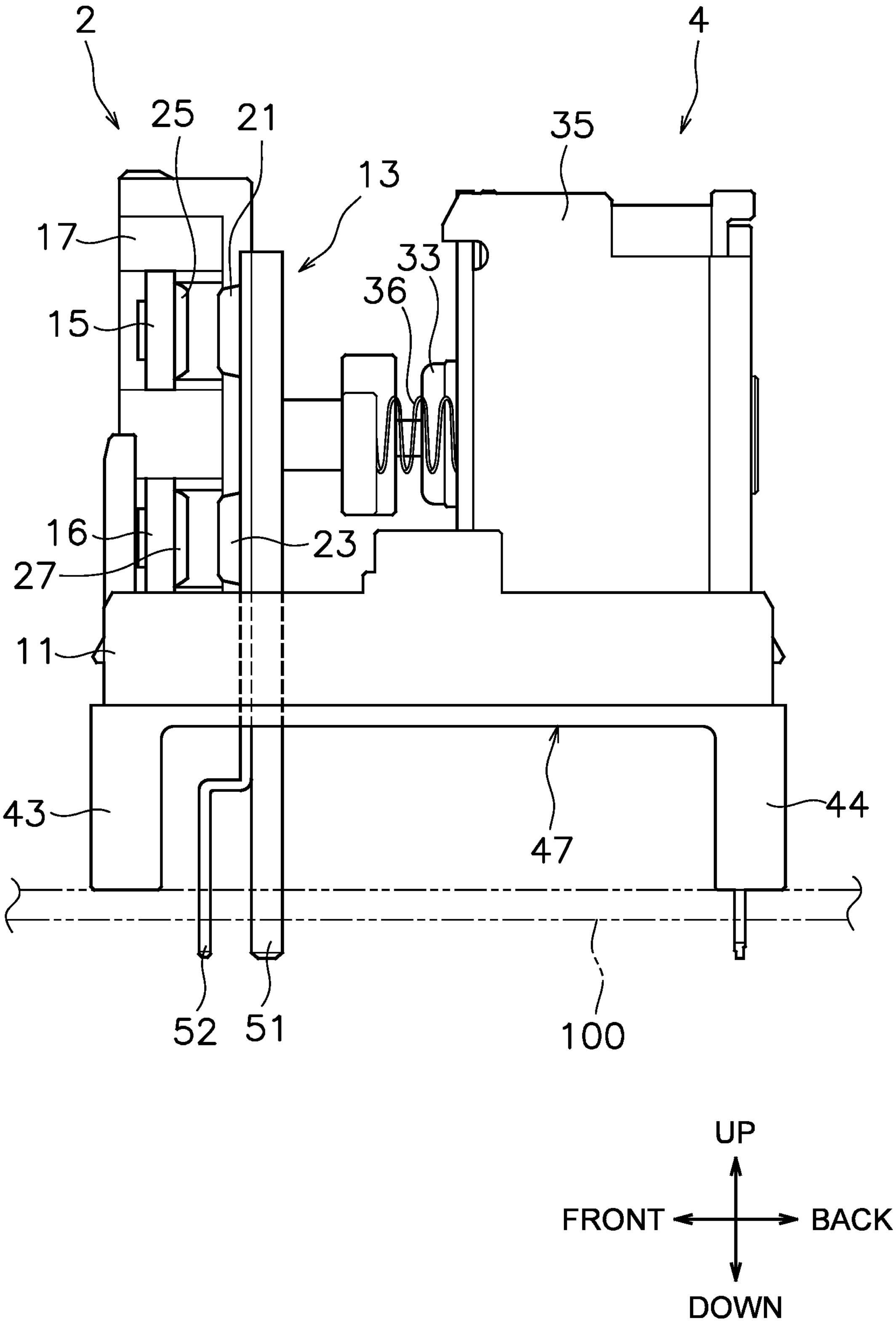
FIG. 5 is a side view of the inside of the electromagnetic relay.

FIG. 5 is a side view of the inside of the electromagnetic relay 1. As shown in FIG. 5, the first fixed terminal 13 includes a first main member 51 and a first layer member 52. The first main member 51 and the first layer member 52 have a plate-like shape. The first main member 51 and the first layer member 52 protrude from inside the housing 3 to outside the housing 3. The first main member 51 and the first layer member 52 are supported by the base 11. The first main member 51 and the first layer member 52 protrude downward from a bottom surface 47 of the base 11 through the base 11 from above the base 11.

As shown in FIGS. 1 and 5, the base 11 includes a plurality of legs 43 to 46. The plurality of legs 43 to 46 protrude downward from the bottom surface 47 of the base 11. As shown in FIG. 5, the plurality of legs 43 to 46 contact a substrate 100 on which the electromagnetic relay 1 is mounted.

Figure 6:
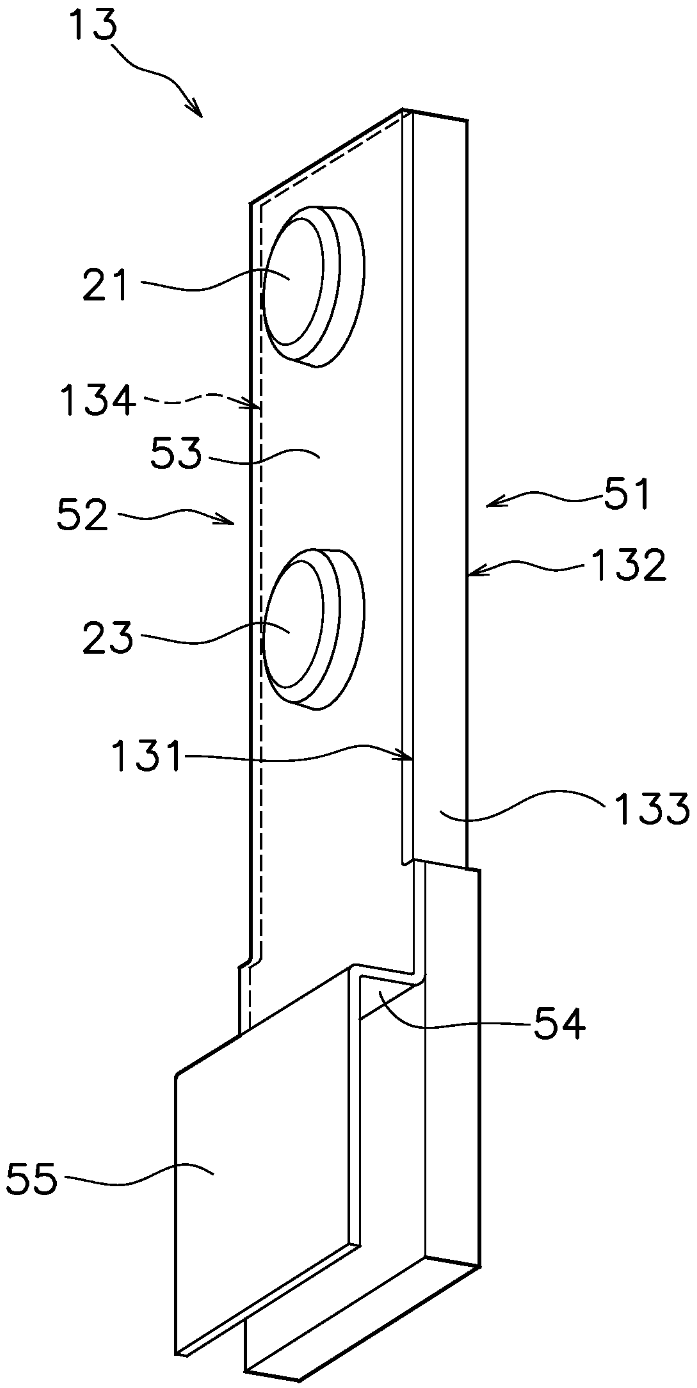
FIG. 6 is a perspective view of a first fixed terminal.
Figure 7:
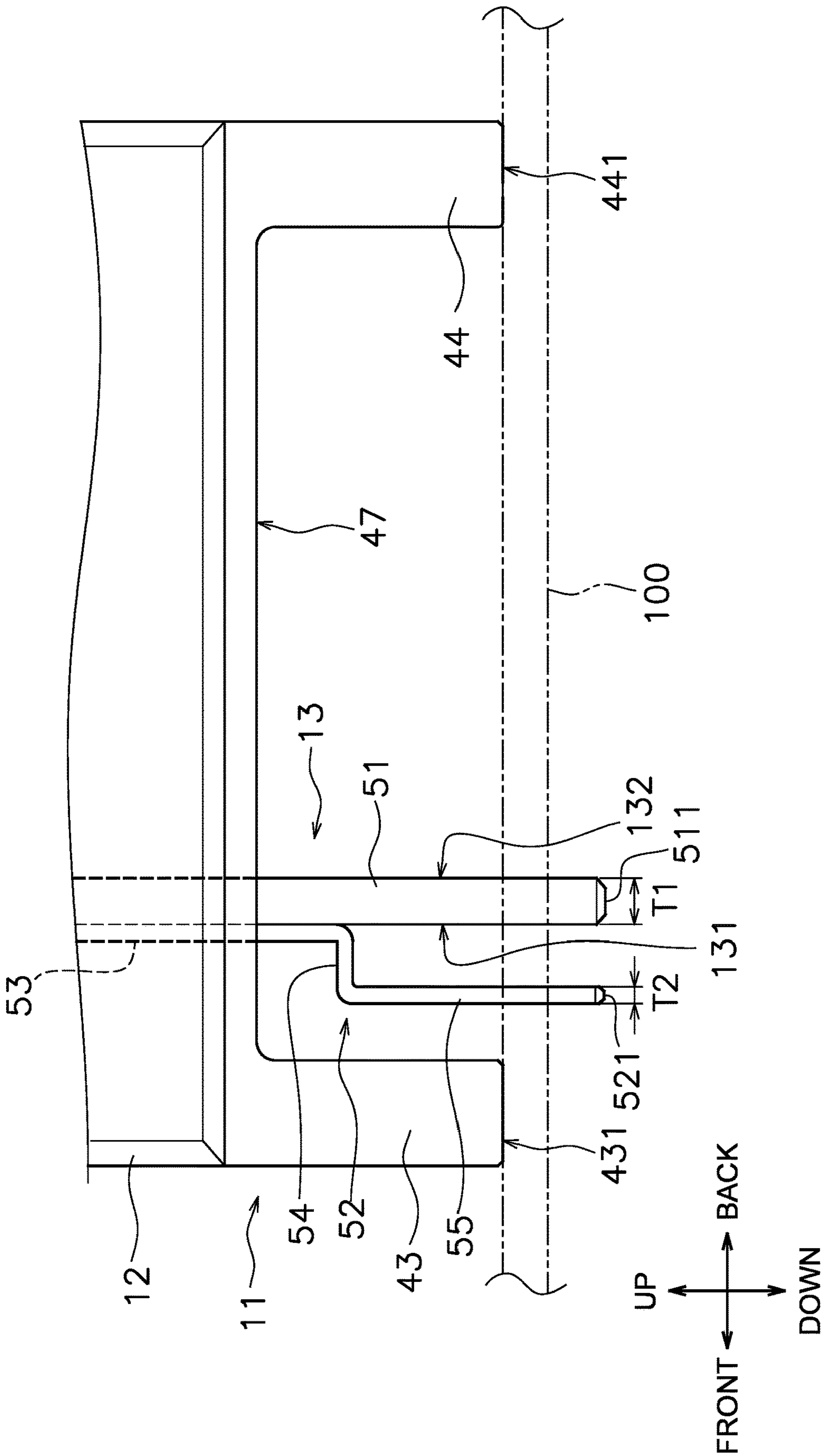
FIG. 7 is an enlarged side view of a lower portion of the electromagnetic relay.

FIG. 6 is a perspective view of the first fixed terminal 13. FIG. 7 is an enlarged side view of the lower portion of the electromagnetic relay 1. As shown in FIGS. 6 and 7, the first main member 51 includes a first surface 131, a second surface 132, a first side surface 133, and a second side surface 134. The first surface 131 faces forward. The second surface 132 is located opposite the first surface 131. The second surface 132 faces rearward.

The first layer member 52 is provided separately from the first main member 51. The first layer member 52 is laminated on the first main member 51. The first layer member 52 is disposed to face the first surface 131 of the first main member 51. The first layer member 52 is connected to the first surface 131. The first layer member 52 is connected to the first main member 51 by, for example, welding or caulking. The first layer member 52 has a plate-like shape that is thinner than the first main member 51.

As shown in FIG. 7, the plate thickness T2 of the first layer member 52 is smaller than the plate thickness T1 of the first main member 51. The horizontal cross-sectional area of the first layer member 52 is smaller than the horizontal cross-sectional area of the first main member 51. The upper portion of the first layer member 52 faces the movable contact pieces 15 and 16 in the housing 3. The first fixed contact 21 and the third fixed contact 23 are attached to the upper portion of the first layer member 52. The lower portion of the first layer member 52 has a bent shape so as to branch off from the first main member 51.

Specifically, the first layer member 52 includes a connecting portion 53, a step portion 54, and a terminal portion 55. The first layer member 52 is bent between the connecting portion 53 and the step portion 54. The first layer member 52 is bent between the step portion 54 and the terminal portion 55. The connecting portion 53 extends vertically. The connecting portion 53 is connected to the first main member 51. The connecting portion 53 is disposed on the first main member 51 in the housing 3.

The step portion 54 is disposed between the connecting portion 53 and the terminal portion 55. The step portion 54 extends in the front-rear direction from the connecting portion 53. The terminal portion 55 extends downward from the step portion 54. The terminal portion 55 is connected to the substrate 100. The step portion 54 and the terminal portion 55 are disposed outside the housing 3. The step portion 54 and the terminal portion 55 are disposed below the bottom surface 47 of the base 11. The terminal portion 55 is spaced apart from the first main member 51 in the front-rear direction.

As shown in FIG. 7, a lower end 511 of the first main member 51 is located below the bottom surface 47 of the base 11. A lower end 521 of the first layer member 52 is located below the bottom surface 47 of the base 11. The lower end 511 of the first main member 51 is located below lower ends 431 and 441 of the legs 43 and 44. The lower end 521 of the first layer member 52 is located below the lower ends 431 and 441 of the legs 43 and 44. The first layer member 52 is electrically connected to the substrate 100 together with the first main member 51.

Figure 8:
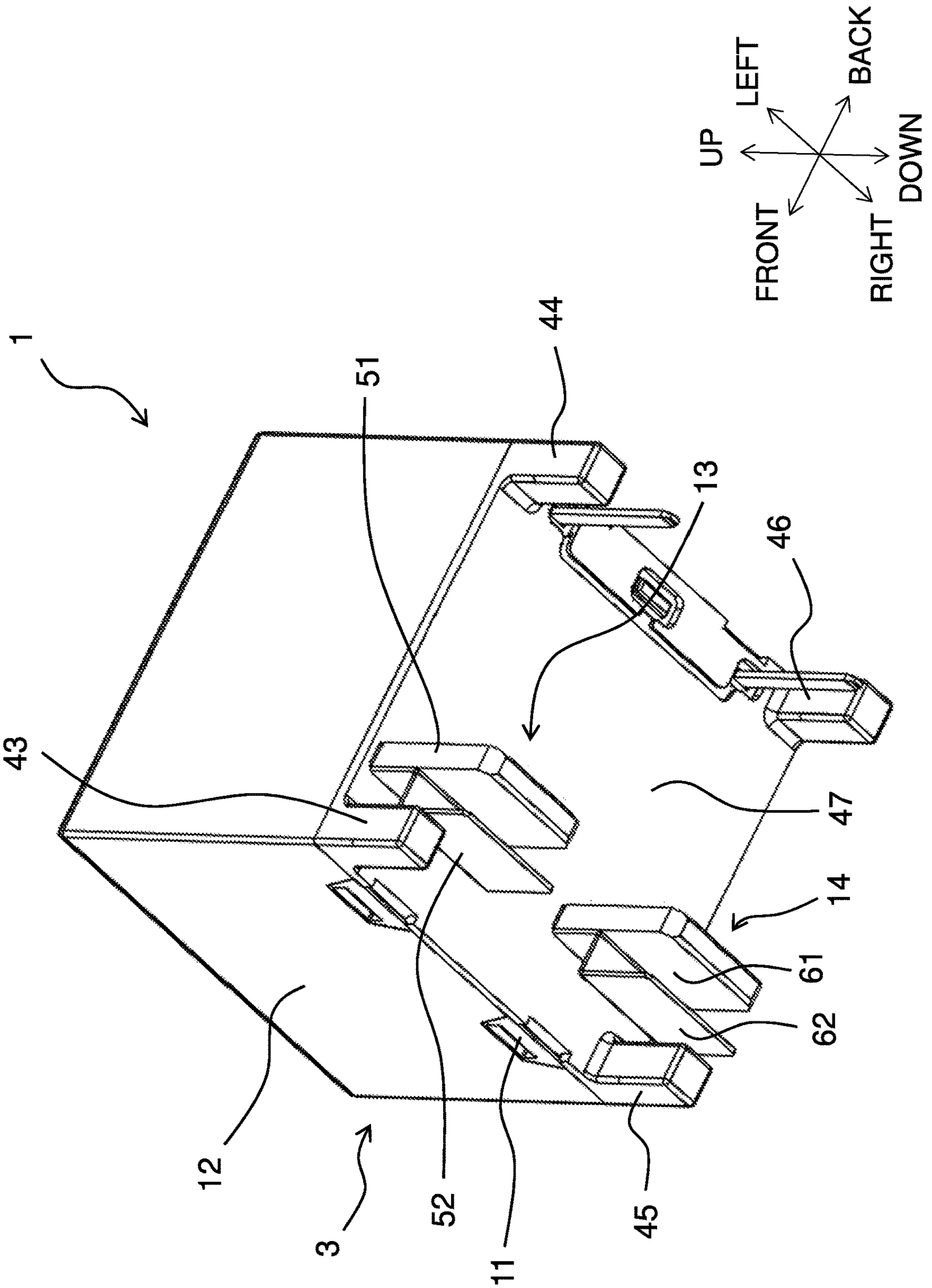
FIG. 8 is a perspective view of the electromagnetic relay viewed from below.

FIG. 8 is a perspective view of the electromagnetic relay 1 as seen from below. As shown in FIGS. 1 and 8, the second fixed terminal 14 has the same shape as the first fixed terminal 13. The second fixed terminal 14 includes a second main member 61 and a second layer member 62. The second main member 61 and the second layer member 62 have plate-like shapes. The second main member 61 and the second layer member 62 project from inside the housing 3 to outside the housing 3. The second main member 61 and the second layer member 62 are supported by the base 11. The second main member 61 and the second layer member 62 protrude downward from the bottom surface 47 of the base 11 through the base 11 from above the base 11.

The second layer member 62 is provided separately from the second main member 61. The second layer member 62 is laminated on the second main member 61. The second layer member 62 is connected to the second main member 61 by, for example, welding or caulking. The second layer member 62 has a plate-like shape that is thinner than the second main member 61. The horizontal cross-sectional area of the second layer member 62 is smaller than the horizontal cross-sectional area of the second main member 61. An upper portion of the second layer member 62 faces the movable contact pieces 15 and 16 inside the housing 3. The second fixed contact 22 and the fourth fixed contact 24 are attached to the upper portion of the second layer member 62. A lower portion of the second layer member 62 has a bent shape so as to branch off from the second main member 61.

The first layer member 52 and the second layer member 62 are disposed in the same direction with respect to the first main member 51 and the second main member 61. That is, the first layer member 52 is disposed in front of the first main member 51. The second layer member 62 is disposed in front of the second main member 61. Alternatively, the first layer member 52 may be disposed behind the first main member 51. The second layer member 62 may be disposed behind the second main member 61.

In the electromagnetic relay 1 according to the present embodiment described above, the first fixed terminal 13 includes the first main member 51 and the first layer member 52 which are provided separately from each other, and the first layer member 52 is branched from the first main member 51. Therefore, the surface area of the first fixed terminal 13 is increased while suppressing the enlargement of the first fixed terminal 13. As a result, the heat dissipation of the first fixed terminal 13 is improved while suppressing an increase in the size of the electromagnetic relay 1.

The current flowing through the first fixed terminal 13 is split between the first main member 51 and the first layer member 52. Therefore, when the electromagnetic relay 1 is mounted to the substrate 100, the heat from the first fixed terminal 13 is distributed to the first main member 51 and the first layer member 52 and transferred to the substrate 100. Thereby, the thermal influence from the first fixed terminal 13 to the substrate 100 is reduced. Moreover, since the thicknesses of the first main member 51 and the first layer member 52 are reduced respectively, the processing accuracy of the first main member 51 and the first layer member 52 is improved. For example, bending of the first layer member 52 is facilitated.

The second fixed terminal 14 includes the second main member 61 and the second layer member 62. The second main member 61 and the second layer member 62 have structures similar to those of the first main member 51 and the first layer member 52, respectively. Therefore, the same effect as the first fixed terminal 13 can be obtained for the second fixed terminal 14 as well.

Although one embodiment of the present invention has been described above, the present invention is not limited to the above embodiments, and various modifications are possible without departing from the gist of the invention.

The structures of the contact device 2 and the drive device 4 are not limited to those of the above embodiment, and may be modified. For example, in the above-described embodiment, the electromagnetic relay 1 is of a so-called plunger type. However, in another type of electromagnetic relay such as a hinge type, a fixed terminal having a structure similar to that of the first fixed terminal 13 described above may be provided.

The shapes or arrangements of the first fixed terminal 13, the second fixed terminal 14, the first movable contact piece 15, and the second movable contact piece 16 may be changed. For example, the first movable contact piece 15 and the second movable contact piece 16 may be integrated. That is, the first to fourth movable contacts 25 to 28 may be connected to an integrated movable contact piece. Alternatively, the second movable contact piece 16, the third and fourth movable contacts 27 and 28, and the third and fourth fixed contacts 23 and 24 may be omitted.

The first fixed contact 21 and the third fixed contact 23 may be integrated with the first fixed terminal 13. The first fixed contact 21 and the third fixed contact 23 may be omitted. The second fixed contact 22 and the fourth fixed contact 24 may be integrated with the second fixed terminal 14. The second fixed contact 22 and the fourth fixed contact 24 may be omitted.

The first movable contact 25 and the second movable contact 26 may be integrated with the first movable contact piece 15. The first movable contact 25 and the second movable contact 26 may be omitted. The third movable contact 27 and the fourth movable contact 28 may be integrated with the second movable contact piece 16. The third movable contact 27 and the fourth movable contact 28 may be omitted.

In the above embodiment, the entire terminal portion 55 of the first layer member 52 is located outside the housing 3. However, a portion of the terminal portion 55 of the first layer member 52 may be located inside the housing 3. That is, the first layer member 52 may be bent outside the housing 3 or may be bent inside the housing 3.

Figure 9:
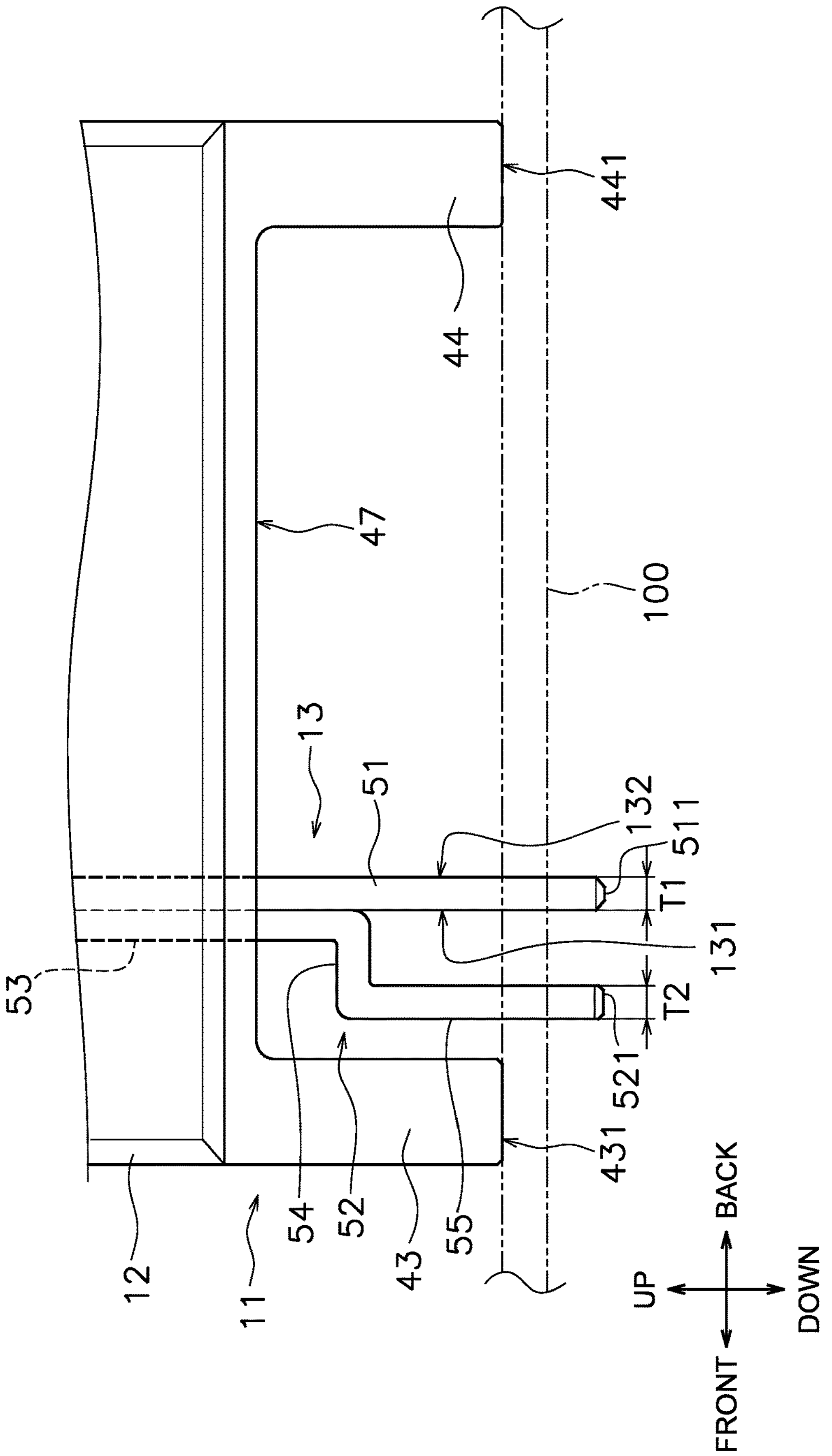
FIG. 9 is a side view showing the lower portion of the electromagnetic relay according to a first modification.

In the above embodiment, the plate thickness T2 of the first layer member 52 is smaller than the plate thickness T1 of the first main member 51. However, the thickness T2 of the first layer member 52 may be the same as the thickness T1 of the first main member 51, as in the first modification shown in FIG. 9. Alternatively, the plate thickness T2 of the first layer member 52 may be larger than the plate thickness T1 of the first main member 51. As in the first fixed terminal 13 according to the first modification, the thickness T2 of the first layer member 52 and the thickness T1 of the first main member 51 are adjusted so that the temperature rise value for each of the first main members 51 and the first layer member 52 can be arbitrarily adjusted. Although illustration is omitted, the second fixed terminal 14 may also have the same structure as the first fixed terminal 13 according to the first modification.

Figure 10:
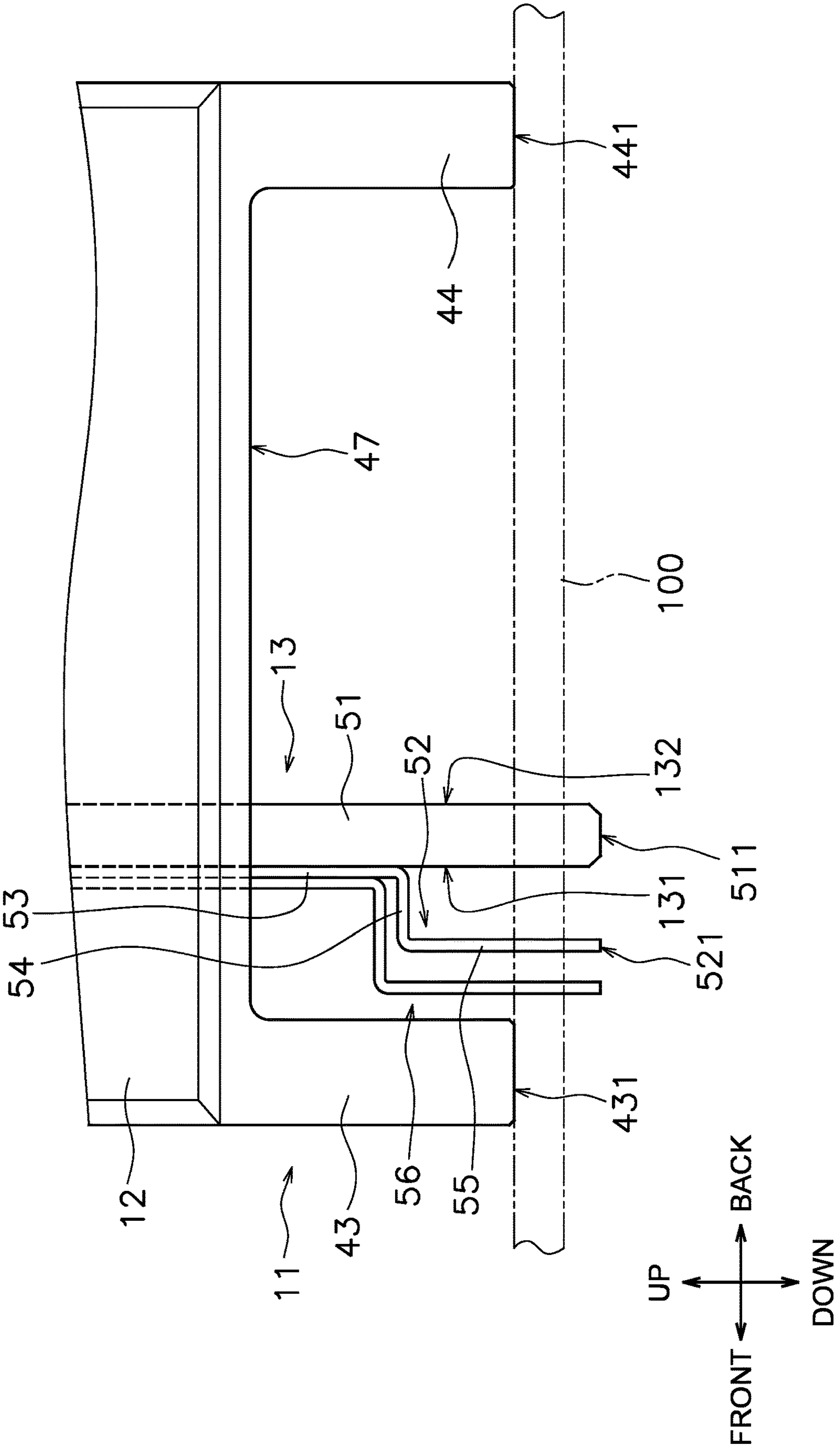
FIG. 10 is a side view showing the lower portion of the electromagnetic relay according to a second modification.

FIG. 10 is a side view showing the first fixed terminal 13 according to the second modification. As shown in FIG. 10, the first fixed terminal 13 may further include a third layer member 56. The third layer member 56 is provided separately from the first main member 51 and the first layer member 52, protrudes from inside the housing 3 to the outside the housing 3, and has a shape branched from the first main member 51. The third layer member 56 has a bent shape like the first layer member 52. The third layer member 56 is laminated on the first layer member 52. The first layer member 52 is disposed between the first main member 51 and the third layer member 56.

In the first fixed terminal 13 according to the second modification, the third layer member 56 further increases the surface area of the first fixed terminal 13. Thereby, the heat dissipation of the first fixed terminal 13 is further improved. Although illustration is omitted, the second fixed terminal 14 may also have the same structure as the first fixed terminal 13 according to the second modification.

Figure 11:
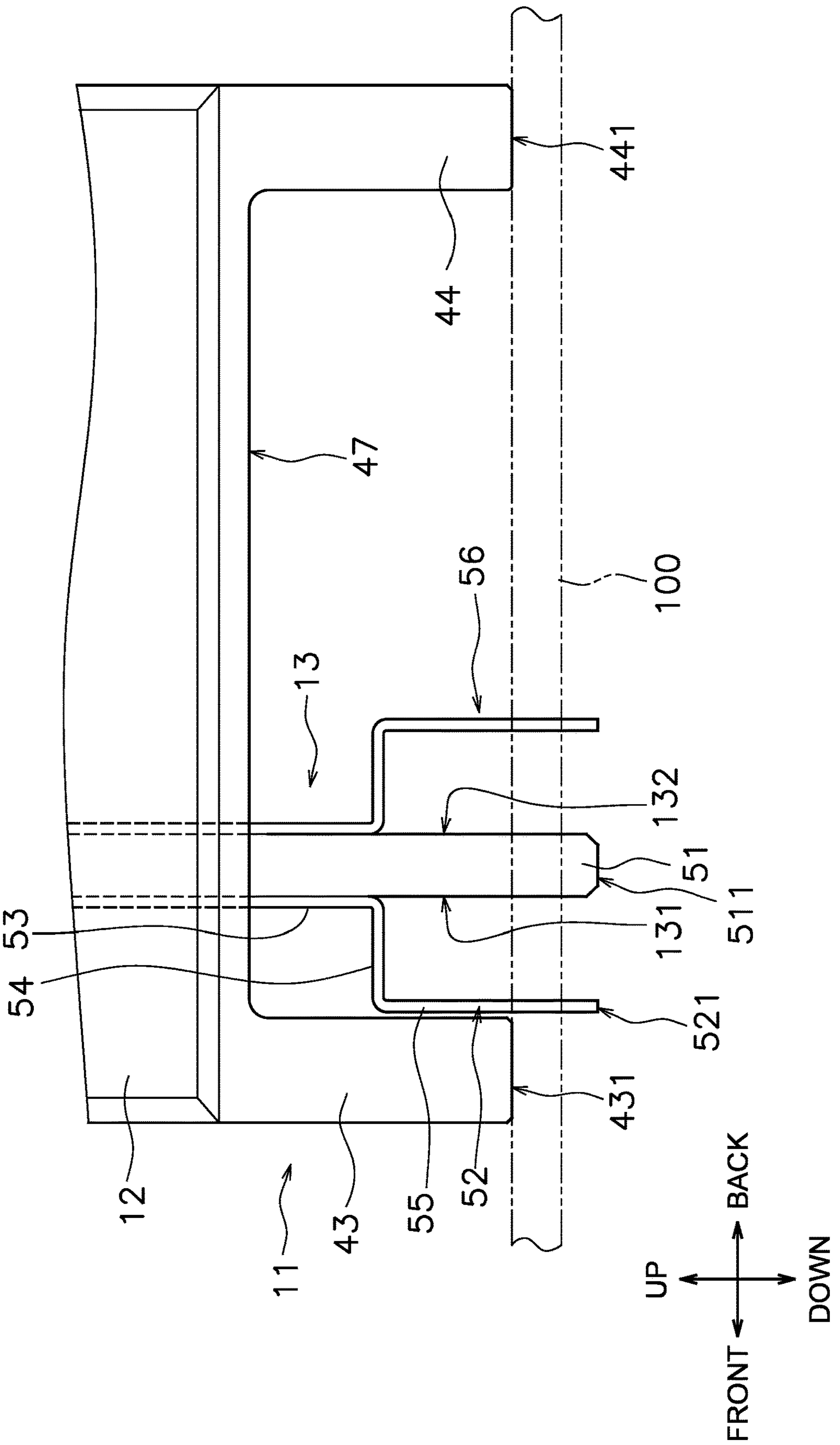
FIG. 11 is a side view showing the lower portion of the electromagnetic relay according to a third modification.

FIG. 11 is a side view showing the first fixed terminal 13 according to the third modification. As shown in FIG. 11, the third layer member 56 may be laminated on the first main member 51 on the side opposite to the first layer member 52. The third layer member 56 is disposed to face the second surface 132 of the first main member 51. The third layer member 56 is connected to the second surface 132.

The first main member 51 is disposed between the first layer member 52 and the third layer member 56. The third layer member 56 has a shape bent symmetrically with the first layer member 52 with respect to the first main member 51. Also in the first fixed terminal 13 according to the third modification, the third layer member 56 further improves heat dissipation. Although illustration is omitted, the second fixed terminal 14 may also have the same structure as the first fixed terminal 13 according to the third modification.

Figure 12:
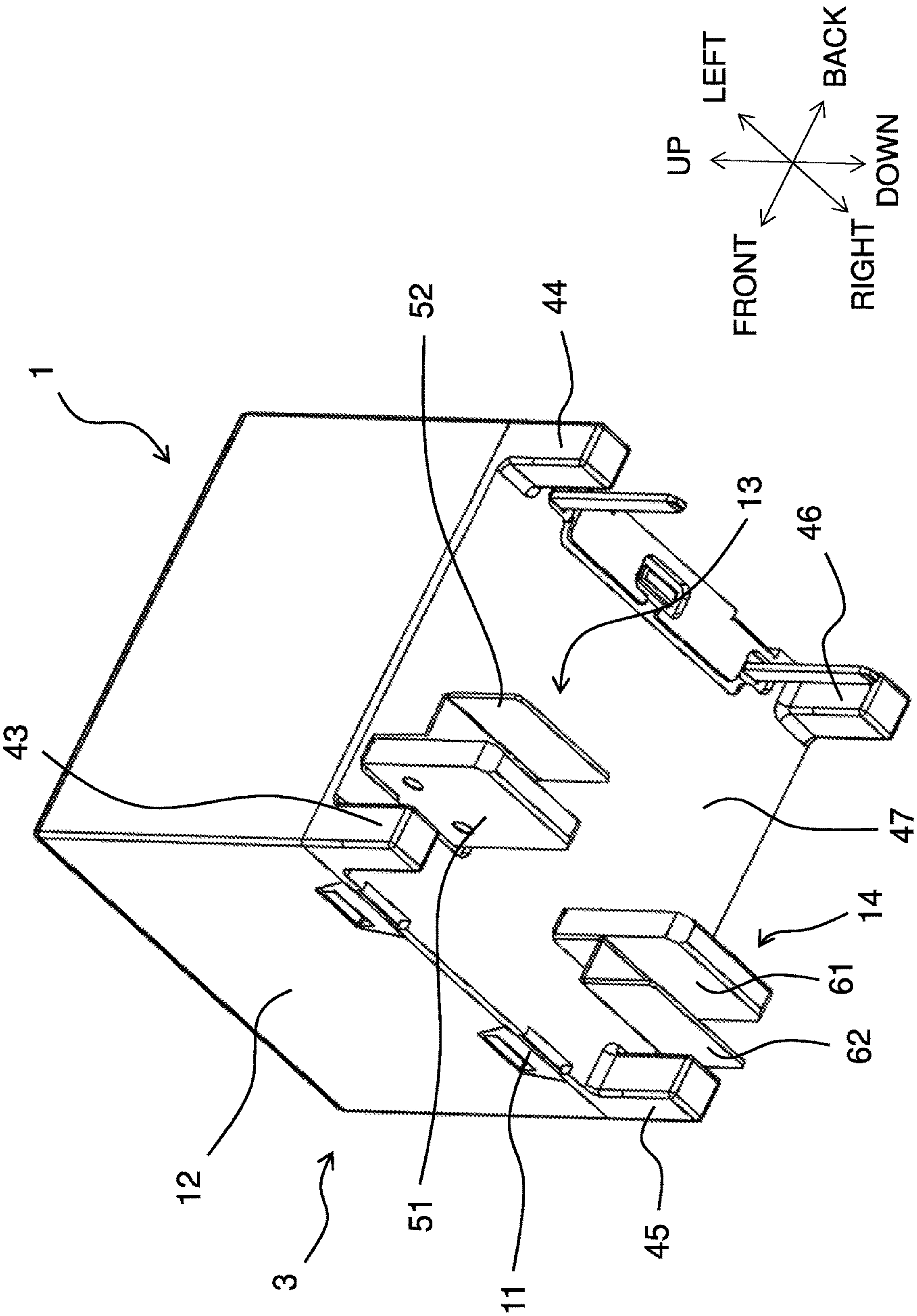
FIG. 12 is a bottom perspective view of the electromagnetic relay according to another embodiment.

In the first embodiment described above, the first layer member 52 and the second layer member 62 are disposed on the same side with respect to the first main member 51 and the second main member 61. However, the first layer member 52 and the second layer member 62 may be disposed on the sides opposite to each other with respect to the first main member 51 and the second main member 61. For example, as shown in FIG. 12, the first layer member 52 may be disposed behind the first main member 51 and the second layer member 62 may be disposed in front of the second main member 61. Alternatively, the first layer member 52 may be disposed in front of the first main member 51 and the second layer member 62 may be disposed behind the second main member 61.

REFERENCE SIGNS LIST

3: Housing, 4: Drive device, 11: Base, 13: First fixed terminal, 14: Second fixed terminal, 15: First movable contact piece, 51: First main member, 52: First layer member, 53: Connecting portion, 54: Step portion, 55: Terminal portion, 56: Third layer member, 43 to 46: Leg portions, 61: Second main member, 62: Second layer member

The invention claimed is:

1. An electromagnetic relay, comprising:

a housing;

a first fixed terminal including a first main member protruding from inside the housing to outside the housing, and a first layer member provided separately from the first main member, the first layer member being laminated on the first main member, the first layer member protruding from inside the housing to outside the housing, the first layer member having a shape branched from the first main member;

a movable contact piece facing the first fixed terminal, the movable contact piece being disposed in the housing; and a drive device configured to move the movable contact piece in a contact direction and an opening direction, the contact direction being a direction in which the movable contact piece contacts the first fixed terminal, the opening direction being a direction in which the movable contact piece separates from the first fixed terminal;

wherein the first layer member includes a connecting portion disposed on the first main member in the housing and a terminal portion at least partially disposed outside the housing and spaced apart from the first main member.

2. The electromagnetic relay according to claim 1, wherein the first layer member further includes a step portion disposed between the connecting portion and the terminal portion, and the first layer member is bent between the connecting portion and the step portion and between the step portion and the terminal portion.

3. The electromagnetic relay according to claim 1, wherein the housing includes a base that supports the first fixed terminal, the first fixed terminal protrudes from a bottom surface of the base to outside the housing, a lower end of the first main member is located below the bottom surface of the base, and a lower end of the first layer member is located below the bottom surface of the base.

4. The electromagnetic relay according to claim 1, wherein the first main member and the first layer member have a plate-like shape, and a plate thickness of the first layer member is different from a plate thickness of the first main member.

5. The electromagnetic relay according to claim 1, further comprising:

a second fixed terminal including a second main member protruding from inside the housing to outside the housing, and a second layer member provided separately from the second main member, the second layer member being laminated on the second main member, the second layer member protruding from inside the housing to outside the housing, the second layer member having a shape branched from the second main member.

6. The electromagnetic relay according to claim 5, wherein the first layer member and the second layer member are disposed on a same side with respect to the first main member and the second main member.

7. The electromagnetic relay according to claim 5, wherein the first layer member and the second layer member are disposed on opposite sides to each other with respect to the first main member and the second main member.

8. An electromagnetic relay, comprising:

a housing;

a first fixed terminal including a first main member protruding from inside the housing to outside the housing, and a first layer member provided separately from the first main member, the first layer member being laminated on the first main member, the first layer member protruding from inside the housing to outside the housing, the first layer member having a shape branched from the first main member;

a movable contact piece facing the first fixed terminal, the movable contact piece being disposed in the housing; and a drive device configured to move the movable contact piece in a contact direction and an opening direction, the contact direction being a direction in which the movable contact piece contacts the first fixed terminal, the opening direction being a direction in which the movable contact piece separates from the first fixed terminal;

wherein the housing includes a base that supports the first fixed terminal, the first fixed terminal protrudes from a bottom surface of the base to outside the housing, a lower end of the first main member is located below the bottom surface of the base, a lower end of the first layer member is located below the bottom surface of the base, the base includes a leg portion protruding downward from the bottom surface, the lower end of the first main member is located below a lower end of the leg portion, and the lower end of the first layer member is located below the lower end of the leg portion.

9. An electromagnetic relay, comprising:

a housing;

a first fixed terminal including a first main member protruding from inside the housing to outside the housing, and a first layer member provided separately from the first main member, the first layer member being laminated on the first main member, the first layer member protruding from inside the housing to outside the housing, the first layer member having a shape branched from the first main member;

a movable contact piece facing the first fixed terminal, the movable contact piece being disposed in the housing; and a drive device configured to move the movable contact piece in a contact direction and an opening direction, the contact direction being a direction in which the movable contact piece contacts the first fixed terminal, the opening direction being a direction in which the movable contact piece separates from the first fixed terminal;

wherein the first fixed terminal further includes a third layer member, and the third layer member is provided separately from the first main member and the first layer member, protrudes from inside the housing to outside the housing, and has a shape branched from the first main member.

10. The electromagnetic relay according to claim 9, wherein the third layer member is laminated on the first layer member.

11. The electromagnetic relay according to claim 9, wherein the third layer member is laminated on the first main member on a side opposite to the first layer member.

* * * * *